United States Patent [19]

Migitaka et al.

[11] 3,768,037
[45] Oct. 23, 1973

[54] SEMICONDUCTOR DIODE LASER DEVICE

[75] Inventors: Masatoshi Migitaka, Kodaira-shi; Katutoshi Saito, Tokyo, both of Japan

[73] Assignee: Hitachi, Ltd., Tokyo, Japan

[22] Filed: Nov. 16, 1966

[21] Appl. No.: 594,933

[30] Foreign Application Priority Data
Nov. 26, 1965 Japan.................................. 40/72218
Oct. 24, 1966 Japan.................................. 41/69707

[52] U.S. Cl. ............................ 332/7.51, 331/94.5
[51] Int. Cl. ......................... H01s 3/10, H01s 3/18
[58] Field of Search.................. 331/94.5; 332/7.51; 307/312

[56] References Cited
UNITED STATES PATENTS

| 3,430,160 | 2/1969  | Kosonocky     | 307/312  |
|-----------|---------|---------------|----------|
| 3,439,289 | 4/1969  | Kosonocky     | 307/312  |
| 3,483,480 | 12/1969 | Nannichi      | 307/312  |
| 3,257,626 | 6/1966  | Marinace et al.| 331/94.5|
| 3,341,937 | 9/1967  | Dill          | 331/94.5 |
| 3,354,406 | 11/1967 | Kiss          | 331/94.5 |
| 3,427,563 | 2/1969  | Lasher        | 331/94.5 |
| 3,239,688 | 3/1966  | Price         | 332/7.51 |
| 3,295,911 | 1/1967  | Ashkin et al. | 332/7.51 |
| 3,303,431 | 2/1967  | Fowler        | 332/7.51 |
| 3,305,685 | 2/1967  | Wang          | 332/7.51 |
| 3,349,475 | 10/1967 | Marinace      | 331/94.5 |

OTHER PUBLICATIONS

Fenner, "Applied Physics Letters," Nov. 15 1964, pp. 198–199.

Primary Examiner—Roy Lake
Assistant Examiner—Darwin R. Hostetter
Attorney—Craig, Antonelli & Hill

[57] ABSTRACT

A semiconductor diode laser device comprising a semiconductor body having a pair of opposed reflecting surfaces which form a laser resonator, the resonator operatively emitting modulated laser beams from one of the reflection surfaces. There is provided within the laser resonator a first pn junction for generating stimulated emission light beams by supplying a forward bias voltage across said pn junction and a second pn junction spaced apart from the first pn junction in the light path of the laser beams for modulating the light by supplying a variable reverse voltage across said second pn junction.

8 Claims, 9 Drawing Figures

PATENTED OCT 23 1973 3,768,037
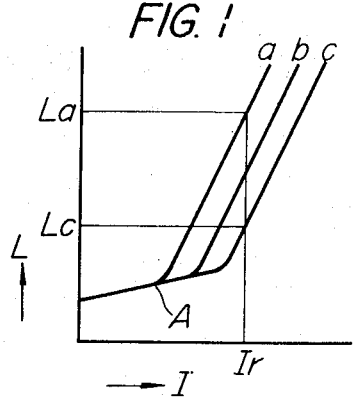
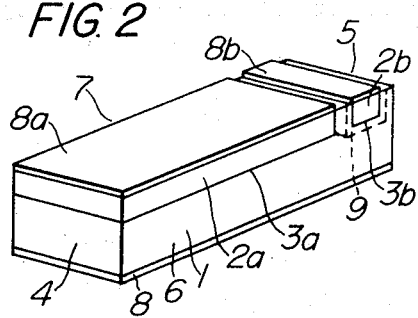
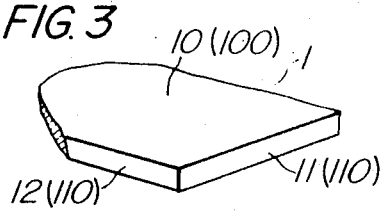
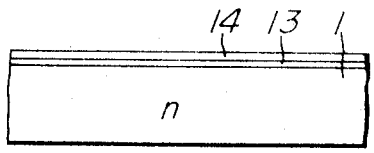
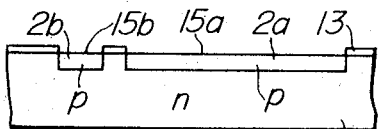
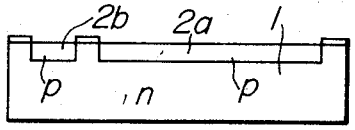
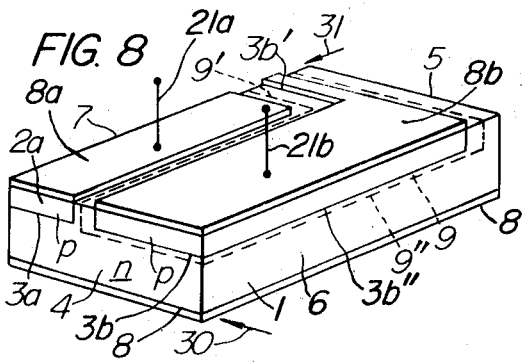
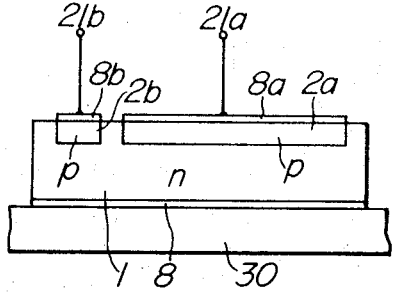
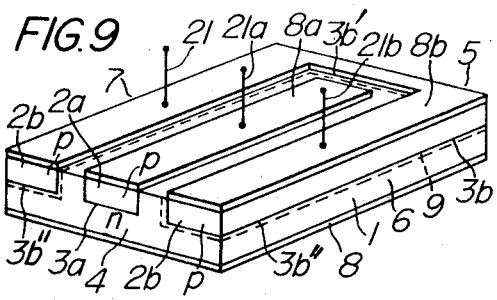
INVENTORS
MASATOSHI MIGITAKA
KATUTOSHI SAITO
BY Paul M. Craig, Jr.
ATTORNEY

SEMICONDUCTOR DIODE LASER DEVICE

This invention relates to semiconductor diode laser devices and more particularly to those of internal modulation type having a modulated laser beam emission function comprising a laser resonator made from a semi-conductor material and laser beam modulating means such as a region of variable depletion layer disposed in the laser resonator.

It is commonly known in the art that the injection of carriers due to forward current supplied through a degenerate pn junction formed from a semiconductor material such, for example, as GaAs, GaSb, InP, InAs or InSb can be utilized to cause radiation by stimulated emission. Such semiconductor device is called an injection laser when considered on the basis of its function and is also called a diode laser when considered on the basis of its structure.

Injected carriers are generally only present in the very neighborhood of the pn junction in a diode laser, and in this region scatters light in every direction, but only the light advancing along the junction face in this region has the greatest chance of causing the stimulated emission. In other words, the light beam advancing in the above direction is solely subjected to amplification by the stimulated emission to have its energy increased and is finally emitted outwardly as a strong light beam through the side face of the semiconductor body having pn junction therein. In this case, the condition required for sustained stimulated emission, that is, the lasing condition is that the gain related to the stimulated emission overcomes all the losses including those due to reflection and diffraction at the side faces of the semiconductor body together with those due to absorption and scattering by free carriers existing in the internal region.

Accordingly, the intensity of a light beam perpendicularly emitted out from one pair of the mutually opposing side faces with a longer distance therebetween is generally stronger than that emitted out from the other pair. For the above reason, a semiconductor diode laser device is mutually formed in such a manner that only such pair of side faces having a longer face-to-face distance is polished to mirror surfaces which are parallel to each other and are perpendicular with respect to the pn junction so as to constitute a Fabry-Perot type resonator, while the other side faces are arranged to make an angle with respect to the pn junction or made to a form of rough surfaces so that the light of specific mode can be derived in a specific direction, i.e., the direction coincident to the axis of the Fabry-Perot type resonator.

A region having high electron and hole densities is developed in the vicinity of the junction when a forward current is made to flow across the pn junction. With a small current, this region emits light owing solely to spontaneous emission and the light is emitted in every direction. In view of its characteristics, this region is called a spontaneous emission region, and in this region, the greater portion of emitter light advances into the p-type and n-type semiconductor regions and is absorbed at the respective semiconductor regions and the electrodes, while the remaining portion of the emitted light reaches the side faces and is either reflected or radiated outwardly.

With an increased probability of stimulated emission resulting from further higher densities of electrons and holes, light amplification begins to take place. More precisely, of all the light beams emitted by the spontaneous emission, the light beam advancing along the longer dimension pn junction has a greatest chance of causing stimulated emission since it travels the longest distance to pass through the above-described high density region, that is, the radiant region. Therefore unless the light beam is extinguished by absorption, the amount of light having the same wavelength and phase is gradually increased in the above-described region and it is finally radiated from the side face as a strong light. However, it does not always follow that the light beam of spontaneous emission advancing in the same direction has the same energy or wavelength. Since the light beam has a certain distributed wavelength range, there is also some kind of distribution in the wavelength of the light emitted from the side face by being amplified by the stimulated emission.

On the other hand, the degree of amplification increases in proportion to the densities of injected electrons and holes, and when a time is reached at which the amplification overcomes the loss in the radiant region and the reflection loss at the side face, the light satisfying the above condition is solely intensely amplified so that the light at a specific wavelength is very strongly radiated. This region is commonly called an oscillation region and the coherent light emitted from this region is variable depending on the value of forward current flowing across the pn junction. Therefore, a conventional semiconductor diode laser device operable to emit out a light beam modulated with electrical signals utilizes a method based on this phenomenon, in which the value of the forward current supplied through the pn junction is varied to effect the modulation. This conventional method, however, is defective in that large electric power is required for the light modulation due to the necessity of varying such an extremely large value of forward current or in that impedance matching is difficult to attain due to the low imput impedance of the pn junction.

In such a semiconductor diode laser device, the arrangement is such that, of the four side faces surrounding the lasing pn junction, one pair of side faces is made in the form of mirror surfaces which are parallel with each other and are perpendicular with respect to the pn junction for thereby forming the laser resonator, while the other pair of side faces is made in the form of rough surfaces or slanted surfaces for thereby inhibiting any oscillation of undesired mode from occurring.

Further, the lasing pn junction is elongated as much as possible so that the oscillation of specific mode defined by the distance between the above-described parallel mirror surfaces can become especially marked, and the longitudinal axis giving a large radiation gain is arranged to run at right angles with respect to the above-described parallel mirror surfaces.

Accordingly the conventional diode laser device itself has an extremely elongated shape and the cleavage of semi-conductor crystals is commonly utilized to obtain such an elongated semiconductor. Consider a case in which gallium arsenide (GaAs) is used for example as such semiconductor body. In this case, if the pn junction is selected to coincide with the plane (100), then all of the four side faces of the body surrounding the pn junction can be formed of the planes (110) which are crystal faces having a weakest bond. It is thus possible to easily cleave a GaAs semiconductor structure from the GaAs crystal by merely applying an edges tool to the ends of the crystal. Further the cleavage planes obtained in this manner can be employed in their cleaved state to provide parallel mirror surfaces required for making a Fabry-Perot type resonator.

Further, in the semiconductor diode laser device of the structure as described above, however, such side faces other than those required to be the Fabry-Perot resonator must be made in the form of rough surfaces or slanted surfaces in order to suppress oscillation of an undesired mode developed by reflection between these faces. Therefore in making a semiconductor structure by the utilization of cleavage of crystal faces having the weakest bond, it has heretofore been necessary to add a working step of roughening that pair of side faces which are parallel to the longitudinal direction of the semiconductor structure. Due to the fact that the semiconductor structure itself is very small and has an elongated shape, such roughening work has not only resulted in an additional working step but also brought forth considerable troubles including an increased possibility of breaking the semiconductor structure and damaging the metal electrodes deposited on the semiconductor structure surfaces for supplying current across the pn junction.

It is therefore the primary object of the invention to provide a novel semiconductor diode laser device in which the laser beam can be modulated without varying the value of the forward current supplied through the lasing pn junction.

Another object of the present invention is to provide a semiconductor diode laser device which can emit a remarkably high modulated laser beam.

A further object of the present invention is to provide a semiconductor diode laser device having an integral structure of a light emitting section and a light modulating section within a laser resonator.

Still another object of the present invention is to provide a semiconductor diode laser device in which any oscillation of undesired mode developed in the direction other than the longitudinal direction of the lasing pn junction is effectively eliminated.

A further object of the present invention is to provide a semiconductor diode laser device which can employ a semiconductor body easily prepared by less manufacturing process steps by leaving such crystal faces of the semiconductor body which have the weakest bond.

A further object of the present invention is to provide a semiconductor diode laser device whose lasing pn junction is substantially protected from any breakage.

Another object of the present invention is to provide a semiconductor diode laser device in which the metal electrodes provided on the semiconductor structure for supplying forward current across the lasing pn junction are substantially free from any damage.

Another object of the present invention is to provide a semiconductor diode laser device in which means for imparting a modulating function to the laser beam modulating section formed integrally with the lasing pn junction effectively cooperates with means for suppressing the oscillation of an undesired mode delivered from the lasing pn junction.

The above and other objects, advantages and features of the present invention will become apparent from the following description with reference to the accompanying drawings, in which:

FIG. 1 is a graphic illustration of the manner of operation of a semiconductor diode laser device;

FIG. 2 is a schematic perspective view of one embodiment of the semiconductor diode laser device according to the invention;

FIG. 3 is an explanatory view of a crystal wafer forming the basic component of the semiconductor diode laser device of the invention;

FIGS. 4 to 7 are diagrammatic sectional views showing the successive manufacturing steps of the semiconductor diode laser device of the invention; and FIGS. 8 and 9 are schematic perspective views of other embodiments of the semiconductor diode laser device according to the invention.

Referring now to FIG. 1, the principles of the present invention will be described hereinafter.

In a semiconductor diode laser device, the transition of its operating region from the spontaneous emission region to the oscillation region takes place when the forward current supplied across the pn junction is gradually increased. This relation will be as illustrated in FIG. 1 in which the forward current I supplied across the pn junction is taken as the horizontal axis and the intensity L of light emitted outwardly from the resonator is taken as the vertical axis. In this case there is a relation $I^n \propto L$ between the forward current I and the light intensity L. Suppose for example that the light intensity L makes an abrupt increase at point A in curve a in FIG. 1. Then $n=1$ at smaller values of current I below the point A and $n \gtrless 1$ at larger values of current I above the point A. Threshold current at such point A varies as a function of light loss in the laser resonator and becomes larger with an increase in the loss. In other words, as the light loss in the laser resonator becomes greater, the threshold current becomes successively larger as shown by curves a, b and c in FIG. 1. Accordingly if, with a constant forward current $I_r$ supplied across the lasing pn junction, the light loss in the laser resonator is varied so that the lasing characteristic is thereby varied from curve a to curve c, the intensity of light emitted outwardly from the laser resonator will decrease from La to Lc.

The present invention is based on the fact that the variation of the laser beam intensity can be effected by varying the light loss in the laser resonator as described above.

The semiconductor laser device according to the invention is characterized in that another pn junction is especially disposed in the laser resonator spaced from the lasing pn junction and formed coplanar therewith in such a manner that when this other pn junction is supplied with a variable reverse voltage, a variable depletion layer having a light absorbing action may be produced in the path of the laser beam within the laser resonator. Since the depletion layer has such properties that it can absorb the light passing therethrough and the magnitude of its light absorbing action is controlled by changing the reverse voltage supplied to the pn junction, the intensity of the light passing through the depletion layer can be modulated in response to the applied reverse voltage, thus a light modulation is performed by the present invention.

One embodiment of the present invention will now be described with reference to FIG. 2 showing a schematic perspective view. The semiconductor diode laser device includes a semiconductor crystal body 1 of one conductivity type which is made in the form of an elongated rectangular plate. On one surface of the semiconductor body 1 there are disposed two spaced semiconductor regions 2a and 2b of conductivity type opposite to that of the body 1. Those faces of these semiconductor regions 2a and 2b which are adjacent to the semiconductor body 1 form pn junction 3a and 3b respectively with the semiconductor body. These pn junctions are formed in a manner that their major planes are aligned coplanar to each other and are arranged side by side in the longitudinal direction of the semiconductor body 1. As shown in FIG. 2, one of the above semiconductor regions 2a occupies the greater portion or almost all of the surface of the semiconductor body 1 and has a substantially elongated shape whose longitudinal direction coincides with that of the semiconductor body 1. while the other semiconductor region 2b is very short compared with the region 2a in the longitudinal direction of the body 1.

The semiconductor body 1 has four side faces 4, 5, 6 and 7, of which the pair of side faces 4 and 5 defining the length of the body 1 are made in the form of mirror surfaces which are parallel to each other and are perpendicular with respect to the plane 3a and 3b of the pn junctions. The other pair of side faces 6 and 7 are made of rough surfaces to have a low coefficient of reflection.

On the lower surface of the semiconductor body 1 a metal layer 8 is formed to serve as an electrode, while on the upper surfaces of the respective semiconductor regions 2a and 2b there are formed metal layers 8a and 8b which also serve as electrodes. Through these metal layers a forward current is supplied across the pn junction 3a and a variable reverse voltage is applied across the pn junction 3b. By the application of the above currents and voltages, photons are produced in the vicinity of the pn junction 3a and a depletion layer 9 is formed in the vicinity of the pn junction 3b. This depletion layer 9 is located at such a position that it occupies a portion of the path of photons during their movement along the pn junction 3a between the parallel mirror surfaces 4 and 5.

The semiconductor diode laser device having such a structure is manufactured in the manner as will be described below. At first a wafer of n-type gallium arsenide (GaAs) having an impurity concentration of $10^{18}$ cm$^{-3}$ is prepared. At least one of the principal surfaces of this wafer must be flat. It is further desired that the crystal faces having the weakest bond be perpendicular with respect to the above principal surface so that the faces cut perpendicularly with respect to the principal surface can have mirror-like properties having a high coefficient of reflection. In the case of the gallium arsenide wafer, it is preferable to select so that its principal surface 10 is formed of the plane (100) as shown in FIG. 3. By so selecting, side faces 11 and 12 perpendicular with respect to the principal surface 10 can be formed of the planes (110) having the weakest bond and the conditions required for the wafer can thus be satisfied.

In the next step as shown in FIG. 4, tetraethoxy silane is subjected to low temperature decomposition to cause growth of a silicon dioxide (SiO$_2$) film 13 about 1 micron thick on the principal surface 10 of the n-type gallium arsenide wafer 1. Then a photosensitive resin film 14 is coated on the silicon dioxide film 13. The photosensitive resin referred to above may preferably be the one sold under the trade name of KPR or KMER (both a product of Kodak Company) commonly employed in the field of semiconductor devices. The above photosensitive resin film 14 is then exposed to light through a pattern mask (not shown) having a 0.05 mm wide linear opaque portion and a 0.1 mm wide linear opaque portion arranged in parallel with each other with a spacing of 0.05 mm there-between. By the above light exposure, the opaque pattern is solely left as non-sensitized portions on the photo-sensitive resin film 14, while the remaining sensitized portion is converted into a film which is resistive to a solvent of some kind. It is therefore possible to selectively dissolve and remove the non-sensitized portions of the photosensitive resin film 14 and the portions of the SiO$_2$ film 13 lying directly therebelow, so that portions of the semiconductor body 1 are exposed at the removed portions of the SiO$_2$ film 13. These exposed portions of the semiconductor body 1 are shown by 15a and 15b in FIG. 5. FIG. 5 shows that zinc is diffused into the semiconductor body 1 having its portions 15a and 15b exposed through the removed portions of the SiO$_2$ film 13 with the result that two p-type semiconductor regions 2a and 2b having a depth of about 7 microns are formed on the surface portion of the body 1.

In the condition as shown in FIG. 5, a plurality of sets of the p-type regions 2a and 2b are formed on the single wafer. It is therefore necessary to split the wafer in order to obtain a diode laser device as shown in FIG. 2. The cleavage of crystal faces having the weakest bond is utilized for the splitting of the wafer into a plurality of sections. At first, the wafer is split into sections in a direction perpendicular with respect to the p-type semiconductor regions linearly formed on the wafer surface so that each section has a width of 0.1 mm. Then each section is split into pieces in a direction parallel to the p-type semiconductor regions so that each piece of n-type semiconductor body 1 has a pair of p-type semi-conductor regions 2a and 2b thereon as shown in FIG. 6.

Nickel and indium are then electroplated on the lower surface of the n-type semiconductor body 1 to form an electrode 8 and nickel is electroplated on the respective p-type semiconductor regions 2a and 2b to provide electrodes 8a and 8b as shown in FIG. 7. A support member 30 such as a stem is fixed to the semiconductor structure thus obtained and then surface roughening work is applied to the side faces 6 and 7 with the upper surface portion protected by a covering of resin or like material. After removal of such surfaces protecting covering, leads 21a and 21b are attached to the respective electrodes 8a and 8b.

According to one embodiment of the invention, as described above, the semiconductor body 1 is in the form of an elongated rectangular plate having a semiconductor region 2a which forms the lasing pn junction. However, in a modified form of this arrangement the shape of the body 1 may be of non-elongated form. Indeed, a body 1 constructed to be of non-elongated form provides a construction which is mechanically stronger than a body which is in elongated form. Where such a non-elongated configuration of the body 1 is utilized, the semiconductor region 2a should be formed in an elongated shape with a substantially smaller width and the lasing pn junction formed thereby should terminate at a position near one of the opposing Fabry-Perot reflecting faces on one end and the other of the Fabry-Perot resonator faces on the other end, but the remaining two sides of the pn junction need not necessarily extend to the side faces of the body. When using this modified form of the body 1, the pn junction which forms the laser beam modulating depletion layer region is disposed in the path of the light emitted from the lasing pn junction and is shaped so that at least part thereof is of narrow width, this narrow width portion extending in the lateral direction of the elongation of the lasing pn junction in such a manner as to be inserted between on longitudinal end of the latter and the first face of the Fabry-Perot resonator. That part of the pn junction not inserted between one longitudinal end of the lasing pn junction and the first face of the Fabry-Perot resonator may be relatively large width and extend on one side or on both sides of the lasing pn junction along with the longitudinal direction thereof. Therefore, in the depletion layer formed by the laser beam modulating pn junction described above, that portion of the depletion layer which is formed with a large width along the longitudinal direction of the lasing pn junction has such a great light absorbing action that the reflection amplification of photons radiated toward this depletion layer portion can be completely suppressed. It wil thus be understood that by employing such a structure, it is possible to completely eliminate the oscillation of undesired modes defined by the lateral side faces, and the substantially parallel mirror-like faces revealed by cleavage of the crystal faces of weakest bond can be used in their cleaved state as the four side faces of the semiconductor laser structure, thus eliminating any additional steps including the roughening part of the faces other than the Fabry-Perot faces. As a result, the numer of rejects due to the breakage of pn junctions or metal electrodes or damage of semiconductor structures caused by the surface roughening work or surface bevelling work can be remarkably reduced. Further, said wide pn junction portion can be used as the electrode lead mounting portion for the application of light modulation voltage thereto since it has a large surface area.

Further embodiments of the invention will now be described with reference to FIGS. 8 and 9.

FIG. 8 is a schematic perspective view of a further improved form of the semiconductor diode laser device according to the invention, and like reference numerals are used to denote like parts appearing in FIG. 2.

The semiconductor diode laser device of FIG. 8 includes an $n$-type semiconductor body 1 being provided on the surface thereof with two $p$-type semiconductor regions 2a and 2b. These $p$-type semiconductor regions 2a and 2b are so disposed that one of the regions 2b of L-like shape surrounds the other region 2a. The p-type semiconductor region 2a forms an elongated pn junction 3a between it and the $n$-type semiconductor body 1 and this pn junction acts as a lasing region with a forward current being supplied therethrough via terminal 21a. The other $p$-type semiconductor region 2b forms an L-shaped pn junction 3b between it and the $n$-type semiconductor body 1. The L-shaped pn junction 3b comprises a narrow width portion 3b' extending in a manner as to be interposed between the longitudinal extension of the pn junction 3a and the Fabry-Perot face 5 and a large width portion 3b' extending along the longitudinal direction of the pn junction 3a.

In operation, a reverse voltage is applied between the terminal 21b connected to the L-shaped P-type region 2b and the electrode 8 connected to the body 1 to establish a depletion layer region 9 in the vicinity of the pn junction 36. This depletion layer region 9 also comprises a narrow width portion 9' and a large width portion 9'' corresponding to the shape of the pn junction 3b and these portions 9' and 9'' lie in a manner to intercept photons advancing in two different directions from the lasing pn junction 3a. Therefore in the operating state of the device, photons emitted along the pn junction 3a necessarily pass one of the depletion layer regions 9' and 9''. In these regions 9' and 9'', the depletion layer region 9' disposed to intercept the longitudinal extension of the lasing pn junction 3a lies between a pair of side faces 4 and 5 in the form of mirror surfaces and its light absorbing property can be utilized to vary the amount of light loss in the laser resonator formed by the side faces 4 and 5. The other depletion layer region 9'' lies between the other pair of side faces 6 and 7, but due to the fact that the width of this depletion layer region is substantially equal to or larger than the lateral width of the lasing pn junction 3a, the light absorption loss in this depletion layer region becomes greater than the radiation gain in the lasing pn junction region as far as photons reflected back and forth between the side faces 6 and 7 are concerned. For the above reason, any reflection amplification of light between the side faces 6 and 7 can not take place and oscillation of the mode defined by these side faces is completely prevented from occurring even if these side faces were in the form of mirror surfaces. This means that the above depletion layer region 9'' has a function of checking any undesired mode of oscillation developed between the side faces 6 and 7 and by virtue of the above function any surface roughening work or surface bevelling work and troubles resulting therefrom can be eliminated as a matter of fact.

The semiconductor diode laser device having the structure as described above can be manufactured in a manner substantially similar to the manner of manufacture of the device explained previously with reference to FIG. 2. The present device however has at least two side faces 5 and 6, on which the lasing pn junction 3a is not exposed. In splitting a single semiconductor wafer into individual devices, therefore, cleavage may be effected at the side faces 5 and 6 with an edged tool moved in the directions shown by arrows 30 and 31. In this respect the present device is advantageous in that any damage on the lasing pn junction 3a by contact with an edged tool can be avoided.

Practical dimensions of this device may for example be such that the lasing pn junction 3a has an area of 200 microns × 900 microns and the portion 3b' of the light modulating pn junction 3b has an area of 50 microns × 200 microns while the portion 3b'' thereof has an area of 200 microns × 1000 microns. The portion 3b' of the pn junction 3b may preferably be as narrow as possible in order not to obstruct satisfactory lasing, and since it is difficult as a matter of fact to attach a signal applying lead to such a narrow region, this lead may be attached to the portion 3b'' which has a large area.

FIG. 9 is a schematic perspective view of a still further embodiment of the semiconductor diode laser device according to the invention, and like reference numerals are used therein to denote like parts appearing in FIG. 8. The device of FIG. 9 is shown as having electrodes 8, 8a and 8b already formed thereon and therefore pn junctions extending over the upper surface of the semiconductor structure are not clearly shown. However it will be known that the electrodes 8a and 8b are provided on respective $p$-type semiconductor regions 2a and 2b forming pn junctions between them and an n-type semiconductor substrate 1.

In this device, a light modulating pn junction 3b is disposed in the shape of a U surrounding a lasing pn junction 3a as shown in FIG. 9. Accordingly, the light modulating pn junction 3b comprising a narrow width portion 3b' extending in such a manner as to be interposed between the lasing pn junction 3a and a Fabry-Perot face 5 and two large width portions 3b'' extending on both sides of the lasing pn junction 3a. By virtue of such arrangement, the oscillation of an undesired mode occurring between side faces 6 and 7 can be more effectively suppressed and obstructed. This device is further advantageous in that its lasing pn junction 3a can be made to have a more elongated shape and the shape of the semiconductor structure can be suitable selected so that it has a greater mechanical strength. Furthermore this device is advantageous in its excellent directivity and degree of modulation because all the principal parts participating in the lasing and light modulating operations are disposed at positions free from any damage that may result from the cleaving work.

While a few preferred embodiments of the present invention have been described in the foregoing. it will be appreciated that the semiconductor diode laser device of the invention having a laser beam modulating region incorporated in its laser resonator operates so excellently that it gives a high degree of modulation in response to application of a very small modulating signal.

What is claimed is

1. A semiconductor diode laser device comprising:
   a semiconductor body having a pair of opposed reflecting surfaces forming a laser resonator;
   a first pn junction formed within the laser resonator and having a major plane portion extending in a plane perpendicular to said reflecting surfaces;
   a second pn junction formed within the laser resonator and spaced apart from said first pn junction, said second pn junction having a plane portion substantially coplanar to the major plane portion of said first pn junction;
   means for applying to said first pn junction a forward bias voltage having a predetermined value sufficient to cause the semiconductor body in the vicinity of said first pn junction to generate a stimulated emission light beam so that the stimulated emission light beam is generated and advanced in a direction parallel to said first pn junction; and
   means for supplying a variable reverse voltage to said second pn junction so as to establish a variable depletion layer in said semiconductor body in the neighborhood of said second pn junction, the variable depletion layer being positioned in the light path of said stimulated emission light beam between said reflecting surfaces and having a light attenuating property, so that the stimulated emission light beam repeatedly reflected by the reflecting surfaces is attenuated to thereby modulate the resulting laser beam emitted from one of the reflecting surfaces of the laser resonator in accordance with the variable reverse voltage.

2. A semiconductor diode laser device comprising:
   a semiconductor body of one conductivity type having a pair of opposed reflecting surfaces forming a laser resonator;
   two semiconductor regions of another conductivity type opposite to said one conductivity type formed on a surface of said semiconductor body spaced apart from each other so as to form a first and a second pn junction therebetween, respectively, the first pn junction being formed within said laser resonator and having a major plane portion extending in a plane perpendicular to said reflecting surfaces and the second pn junction being formed within said laser resonator and disposed apart from the first pn junction and having a plane portion extending in the same plane as the major plane portion of the first pn junction;
   means for supplying a variable reverse voltage to said second pn junction to establish a variable depletion layer along said second pn junction, said depletion layer operatively attenuating light beams passing therethrough; and
   means for supplying a forward bias voltage of a predetermined value to said first pn junction to generate a stimulated emission light beam, said light beam being advanced along the major plane portion of the first pn junction said repeatedly reflected between said reflecting surfaces under the combined stimulation of said first pn junction and modulation of said depletion layer, to thereby emit from one of said reflecting surfaces a laser beam modulated in accordance with the variable reverse voltage applied across said second pn junction.

3. A semiconductor diode laser device according to claim 1, wherein said first pn junction is formed in the semiconductor body in substantially an elongated shape extending between the reflecting surfaces over a distance less than the spacing between the reflecting surfaces.

4. A semiconductor diode laser device according to claim 11, wherein said semiconductor body is substantially elongated in one direction and wherein said reflecting surfaces are disposed at the longitudinal ends of the longitudinally elongated semiconductor body, said first and second pn junctions having plane portions which are coplanar and spaced from each other in the longitudinal direction in the semiconductor body, the plane portion of said first pn junction being formed in the semiconductor body as an elongated longitudinally extending junction part, and the plane portion of said second pn junction being at least in part thereof disposed between said first pn junction and one of said reflecting surfaces.

5. A semiconductor diode laser device according to claim 4, wherein said second pn junction includes a first portion of relatively small width disposed between said first pn junction and one of said reflecting surfaces and a second portion of relatively larger width than said first portion disposed in parallel to and longitudinally extending along said first pn junction, said first and second portions of the second pn junction establishing a first depletion layer having a light attenuating action in the path of a laser beam advancing in the longitudinal direction of said first pn junction and a second depletion layer having a sufficient light suppressing action in the path of the stimulated emission light beam advancing in directions other than said longitudinal direction of said first pn junction, respectively, and wherein said means for supplying a variable reverse voltage is adjustable to vary the attenuation property of the first depletion layer in accordance with the reverse voltage and to provide the second depletion layer with sufficient light suppressing action to sufficiently suppress light beams advancing in directions other than the longitudinal direction of said first pn junction to thereby provide a modulated laser beam advancing in the longitudinal direction of said first pn junction from the laser resonator, the intensity of which is modulated in accordance with the variation in the variable reverse voltage.

6. A semiconductor diode laser device according to claim 5, wherein said second pn junction is substantially in the form of an L and wherein said second portion of said second pn junction extends longitudinally along one of the longitudinally elongated sides of said first pn junction whereas said first portion of said second pn junction extends transversely along one of the longitudinal ends of said first pn junction.

7. A semiconductor diode laser device according to claim 5, wherein said second portion of said second pn junction extends longitudinally along both elongated sides of said first pn junction 8. A semiconductor diode laser device according to claim 1, wherein said semiconductor body comprises a first conductivity type semiconductor material, said first pn junction is formed between said semiconductor body and a first diffused region of a second conductivity type opposite to said first conductivity type, and said second pn junction is formed between said semiconductor body and a second diffused region of said second conductivity type spaced apart from said first diffused region.

* * * * *